United States Patent [19]

Campbell et al.

[11] Patent Number: 5,598,770
[45] Date of Patent: Feb. 4, 1997

[54] AUTOMATED FEED GRAIN PROCESSING APPARATUS AND METHOD

[75] Inventors: Thomas S. Campbell, Tulia; Ken W. Ridenour; William F. Casey, both of Amarillo, all of Tex.

[73] Assignee: Cactus Feeders, Inc., Amarillo, Tex.

[21] Appl. No.: 506,592

[22] Filed: Jul. 25, 1995

[51] Int. Cl.⁶ .............................................. A23N 17/00
[52] U.S. Cl. ........................... 99/487; 99/516; 99/536
[58] Field of Search ........................... 99/485–487, 489, 99/516, 534, 536, 468, 471, 473, 483; 134/132; 364/469; 426/231, 506, 507, 511, 454, 455

[56] References Cited

U.S. PATENT DOCUMENTS

| | | | |
|---|---|---|---|
| 3,817,261 | 6/1974 | Rogge | 99/536 X |
| 4,508,029 | 4/1985 | Malone | 99/516 |
| 4,817,518 | 4/1989 | Wyatt et al. | 99/516 |
| 4,898,092 | 2/1990 | Greer | 99/487 |
| 4,993,316 | 2/1991 | Greer | 99/487 |
| 5,133,982 | 7/1992 | Bodkin et al. | 426/231 |
| 5,194,275 | 3/1993 | Greer | 426/231 |
| 5,437,882 | 8/1995 | Greer et al. | 426/231 |
| 5,442,995 | 8/1995 | Greer | 99/487 |

*Primary Examiner*—Timothy F. Simone
*Attorney, Agent, or Firm*—Arnold, White & Durkee

[57] ABSTRACT

An automated process is provided for controlling process parameters, such as moisture content and grain feed rate, in a grain processing system. Control of process parameters may be provided by an automatic control system which receives signals from input devices, such as moisture sensors, and generates signals to control the parameters. The automatic control system may provide control signals that are feedback, feedforward, or a combination of feedback and feedforward control. Grain processing system components may include a grain conveyor, a wetting system, a steam chest, a flaking mill, a livestock pelletizer, and/or a cooler assembly.

26 Claims, 4 Drawing Sheets

AUTOMATED FEED GRAIN PROCESSING APPARATUS AND METHOD

FIELD OF THE INVENTION

This invention pertains to grain processing apparatus and methods, in particular to the processing of feed grains in the making of finished feeds for subsequent consumption by livestock.

BACKGROUND

Moisture content of feed grains is believed to be critically important to the quality and palatability of most finished feed products. It may also have a significant impact on the ease with which they are processed into feed, but has been a largely uncontrolled variable in most animal feed manufacturing processes. Moisture levels encountered typically range between eight and sixteen percent in stored grain. New crop grains may have moisture levels in excess of twenty percent. A feed manufacturing facility will commonly process several hundreds of tons of feed grains each day that have been purchased from many sources. Within a matter of minutes the moisture content of the grain being processed can vary several percentage points. Without regulated moisture addition, a highly variable feed product is produced.

The processing of feed grains in the manufacturing of finished livestock feeds is intended to increase the feed value of the grains. "Value" may be defined in terms of palatability and digestibility. The efficiency and profitability of modern livestock enterprises are based in large part on the weight ratio between incoming grain and outgoing product. Incremental improvements in that ratio, which may be generated by improved grain processing methods to eliminate waste and to optimize digestibility, will directly effect the profitability of the livestock operation.

The most simple processing involves either the grinding or dry rolling of the whole kernel grain to fracture the seed coat and to increase the surface area of the grain particles for more efficient digestion. Grain moisture content greatly affects the texture of the final products produced by these dry methods. Very dry grain will tend to make flour, which the animals will not consume readily and typically prefer a larger particle. This flour, or dust, represents a safety hazard in the feed manufacturing facility, both from the explosion potential and from workers breathing it. It also represents a loss of product to the feed manufacturer. Careful control of the moisture level of the grain entering these dry processes can eliminate dust and help to produce a uniform particle size that will improve digestion without being so small as to depress consumption. Livestock feeds are commonly prepared with dry processed grain.

A more sophisticated method of processing feed grains involves cooking them with steam before they are passed through a roller mill (or flaking mill). The cooking process partially gelatinizes the starch in the grain, increasing its digestibility. The rolling step increases surface area of the grain kernel by pressing it into a flat "flake" and also increases gelatinization of the starch matrix. Beef and dairy cattle feeds are commonly steam flaked. Whole kernel grain flows through a chamber into which live steam is injected. Once "cooked", it passes through a roller mill, producing a "flake". If the grain is too dry, the cooking or gelatinizing will be incomplete, since the gelatinizing process requires heat, free moisture and mechanical disruption of the starch matrix. The grain kernel will be hard and will require more energy to roll than a moist, properly cooked kernel. The final flake will be dry and brittle. Subsequent handling of the flake will cause it to break, resulting in "fines" that the animal will not eat readily.

A second processing method involving steam cooking of the grain is pelleting, which is commonly used to prepare poultry feeds. The grain is ground to a uniform texture, mixed with other feed ingredients and treated with steam. The resulting mash is extruded through a die in a pellet mill. As with steam flaking, gelatinization, toughness and durability of the final feed form, are greatly influenced by the moisture content of the grains being processed. The power required to drive the pellet mill, as well as machine life, is also affected by the moisture content of the mash. If it is too dry, more power will be required to extrude the pellet, the cooking will be incomplete and the feed ingredients will not bond well, causing a weak pellet that falls apart. Broken pellets become "fines" that are not eaten and represent a loss to the livestock producer.

U.S. Pat. Nos. 4,898,092 and 4,994,286 (the Greer patents), which were filed in 1988 and 1990, respectively, describe methods for conditioning feed grains and seed grains, including the application of water to the grains to attain a target moisture level. The disclosures of both of the Greer patents are hereby incorporated herein by reference. Greer discloses a method for automatically adding moisture to grains by determining the moisture content of the incoming grain and then adding water (or other liquid) to the grain based on that incoming moisture level.

Greer's systems are feed-forward or predictive systems, and they do not provide for automated measurement of the actual moisture level in the grain after it has been wetted, or at any point later in the process of preparing a feed grain for consumption by livestock. A later Greer patent, U.S. Pat. No. 5,194,275, is also incorporated herein by reference. The Greer '275 patent adds mass flow rate detection to the control system in order to control the rate of liquid application based on both the moisture level of the incoming grain as well as the mass flow rate of the grain.

U.S. Pat. No. 5,133,982 is also incorporated herein by reference. It discloses a grain conditioning system that adds liquid to a grain flow based on feedback from a moisture sensor placed downstream from the liquid applicator. The sensor detects the actual moisture level after liquid addition and mixing. Both bypass and full-stream moisture detection systems are disclosed.

In view of the prior art discussed herein, there is a need for a more efficient feed processing system that provides a consistently optimal quality feed product, regardless of the type and condition of the grain introduced into the processing system. The desired system would incorporate moisture sensors and other sensors throughout the processing system, in order to implement a multi-level, intelligent feedback control system that would provide optimal control over the quality of the finished product.

SUMMARY OF THE INVENTION

The present invention addresses the above-described deficiencies in the prior art by providing automated processes throughout the grain processing system for control of moisture content and other parameters. By monitoring and automating the entire system, substantial benefits can be attained in efficiency and quality control over the finished product. Feedback and feed-forward controls are implemented, as well as adaptive techniques that utilize historical data to optimize the process and to "learn" the most effective methods for treating various types of grain.

The present invention provides a feed-grain processing system that provides improvements and advantages due to the heretofore unknown level of automatic control capabilities that are provided. The basic grain processing system may include a conditioning chamber such as a steamer/flaker system with a preconditioner to provide a desired starting moisture level in the grain. The invention includes moisture sensors which may be placed at various locations in the grain flow path. For example, the moisture level of the incoming grain may be measured and the moisture level of the preconditioned grain may be measured. Those measurements may be used to control the rate of liquid addition in the preconditioning system (wetting system). Another moisture sensor may be provided at the end of the steaming operation. Information from that sensor may be used in controlling the steaming operation, and it may also be fed back into the preconditioning system control routine.

The steam chest may be equipped with humidity and temperature sensors, as well as level sensors. The signals from those sensors are provided to the automatic control system, which generates control signals to control the grain flow rate and the steam input rate, perhaps at several locations within the steam chest. Using the data collection and comprehensive control capabilities of an automatic electronic control system, the grain processing system may be optimized for both product quality and efficiency of operation.

A rotary lock may be employed at the bottom of the steam chest to allow steamed grain to flow out while inhibiting the escape of steam. In preferred embodiments, a peg feeder is provided to selectively feed "cooked" grain into the flaking mill. The speed of the feeder may be placed under the control of the control system.

The flaking mill may be outfitted with a variety of instruments, e.g., a load sensor (current sensor), vibration sensor, temperature sensor, and grain level or proximity sensors. The operational parameters of the flaking mill, including the roller rotational speed and the gap width, may be placed under the control of the control system. The density and moisture level of the flaked grain may be measured and input into the control system. Thus the entire process operation may be automatically controlled, including grain moisture levels, steam chest conditions, and mill speed, gap width and feed rate. The control system thereby facilitates processing of different types and grades of grains without requiring manual adjustments to the processing equipment.

The "front end" of the feed mill may also be included in the automation system, as quantitative and qualitative information about each incoming lot of grain may be input to the control system. This information may be used to direct the grain to an appropriate storage location and to select appropriate processing conditions. Inventory control functions may be performed by the control system, which may also identify grain to be processed and manipulate the distribution system to move grain from a selected storage location to the preconditioning system to initiate processing.

Similarly, the "back end" of the feed mill may also be automated. Finished flake product may be transported to storage bins by a negative-pressure air conveyor system, which may be operated and monitored for malfunction (e.g., plugged flow) and grain moisture and temperatures by the control system. Additives, such as molasses, fats or other feed stock ingredients, may be mixed with flaked grain using automated mixing apparatus, and the finished feed product may be inventoried under computer supervision until it is loaded onto a truck for distribution to feed bunks in livestock holding pens.

The operation of feed distribution trucks may also be monitored by the automatic control system, for example by using wireless telemetry systems to transfer data between a stationary host computer and computers located on the trucks. Such an arrangement permits accurate monitoring of feed consumption by the livestock in each pen, which allows the control system to provide accurate, detailed reports covering the entire feedlot operation. Such information allows livestock performance information to be correlated with grain source and processing variables, permitting the processing operation, as well as the overall feeding operation, to be optimized.

The present invention provides similar advantages for a pelleting process where the moisture content of the product is detected as it exits the conditioning chamber when steam and moisture have been added. The moisture level may be monitored as the product exits the pellet-forming mill. Additional moisture content measurements may be made at various other points in the process and this information may be provided back to a central control system.

The automated control system of this invention may be implemented by, for example, one or more personal computers, by a larger computer, or by a programmable logic controller (PLC). The supervisory computer source code for a present embodiment of the invention is provided as an appendix to this description.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

DESCRIPTION OF PREFERRED EMBODIMENTS

The grain processing method and system of the present invention will be described with reference to a presently preferred embodiment that has been implemented by the inventors. The inventions defined by the claims may be used with equal benefit in other arrangements of livestock feed processing apparatus.

Figure 1:
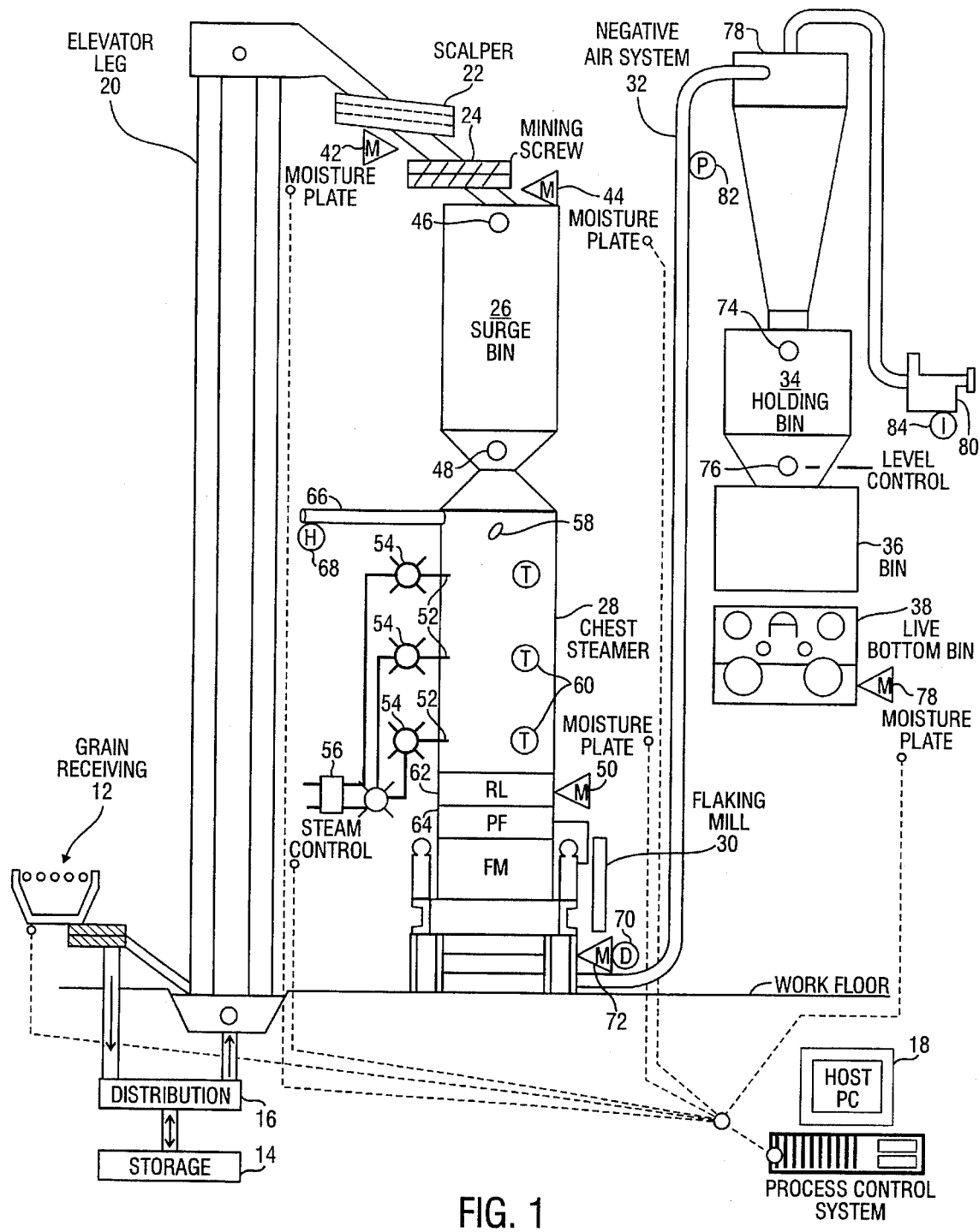
FIG. 1 is a simplified schematic diagram illustrating the main components of a typical steaming/flaking system and the grain flow through those components.

The exemplary processing system of the present invention is briefly described as follows, each of the components being discussed in further detail below. Referring to FIG. 1, a quantity of feed grain is received at a grain receiving station 12, from which it is typically placed in storage containers 14 by distribution system 16 to await processing. The grain may typically be received from rail cars, barges or trucks. Samples of each load of grain will be collected for analysis as part of the receiving process. The results of that analysis may be provided to the comprehensive automation system (based on host computer 18), allowing process parameters to be adjusted to optimize the feed product yield from each load of grain.

An elevator mechanism 20 is provided to cooperate with the distribution system 16 to remove a selected quantity of grain from storage for processing. The elevator 20 typically delivers the grain through a scalper 22, which removes foreign materials, and into a wetting chamber or system 24 that includes means, such as inlets connected to a water source, for adding liquid, such as water and wetting chemicals, to the grain stream and for mixing the stream to permit the moisture to absorb into and adsorb onto the grain.

From the wetting mechanism 24, the grain is deposited into a surge bin 26 that is mounted above a steam chest 28. The surge bin 26 ensures that the steam chest 28 remains full, as grain flows from the surge bin 26 into the steam chest 28 by gravity. In the steam chest 28 the grain is cooked under preselected moisture and temperature conditions, as steam is introduced into the chest. From the bottom of the steam chest the cooked grain enters the flaking mill 30, where the grain is directed to pass between a pair of closely-spaced parallel rollers, which crush and flatten the grain kernels into flakes. A conveyor system such as vacuum system 32 is then typically employed to lift the flaked grain into a flake storage bin 34, which may be connected to additional storage bins 36 and a live-bottom bin 38.

Control of moisture levels in the grain at various points in the process is believed to be vital to optimized efficiency and end-product quality, thus maximizing livestock production per pound of incoming grain. The present invention provides automated process monitoring and control throughout the system. A host computer 18, which may be a PC or a distributed group of computers or controllers, monitors the type of grain being processed, the moisture levels at various points in the system, grain levels and flow rates, and oilier operating parameters. The host computer 18 then signals various automatic control elements to operate to achieve the desired process results. In particular, in the preferred embodiment described above, moisture sensors may be provided at some or all of the following locations: at the grain receiving station 12 (to determine the starting moisture level of the incoming grain), between the scalper 22 and the wetting system 24, at the discharge end of the wetting system 24, in the steam chest 28 ahead of the flaking mill 30, and in the flake holding bin 38. The moisture level detected by each moisture plate is available for use by the computer program (or the human operator) in adjusting the system to maximize efficiency and productivity.

The type and condition of each shipment of grain received at the front end of the processing system may be entered into the control system, so that the system may be preset to optimally process that grain. Each shipment may be identified as to source and type of grain, weighed, qualitatively inspected, and tested for moisture content as it is received, prior to storage. The grain may then be conveyed by distribution systems, which are well known in the art, to storage means. For example, conveyor belts, elevators and vacuum systems may be combined with other distribution equipment in order to conduct the received grain to the desired storage bin, from which it can be retrieved for further processing when desired. The distribution and storage system may be placed under computer control for automated routing and inventory management. The results of laboratory analysis of an incoming grain lot may be supplied to the control system, and the process may be adjusted to optimize the yield based on the laboratory results.

The grain may be processed, as by a screener or scalper 22, to remove trash and/or fines either before or after initial storage. In preferred embodiments, the grain is scalped after it is removed from storage and before it enters the steaming/ flaking system. A high velocity air stream may be used to remove fines from the grain stream at this stage.

The initial step in the flaking process is to precondition the grain to obtain a consistent and desired moisture level, which is typically about 18%. The computer controlled system can be programmed to provide a desired moisture level in the grain that enters flaking mill 30 by controlling the conditions in wetting system 24 and in steam chest 28. The flow rate of the grain through the steam chest and the flaking mill may also be controlled. The wetting system typically may include a liquid storage container, a pump and nozzle system, and a mixing tube having a conditioning screw or auger disposed therein to agitate the grain after it has been sprayed with liquid. The liquid is typically water, which may include surfactant as well other nutritional or otherwise functional additives. The Greer patents, discussed above, disclose suitable preconditioning systems.

The moisture level of the grain may be measured both upstream and downstream of the wetting system using upstream moisture plate 42 and preconditioner moisture plate 44, allowing the control system to employ both feed-forward (predictive) and feed-back techniques to optimize the moisture level of the grain entering the surge bin. The moisture level may be altered by operation of a computer controlled modulating valve that controls the flow rate of liquid from the wetting nozzle. The moisture content measurement at the preconditioner moisture plate 44 may be a primary setpoint in the processing system, and the amount of water added to the grain in the wetting system 24 is controlled to attain the selected setpoint. The upstream moisture plate 42 provides the moisture content of the incoming grain, which can be used to predictively vary the amount of water applied to the grain if the moisture content of the incoming grain changes, without waiting for a change to be noticed at the preconditioner moisture plate 44.

Surfactants or other chemical or nutritive additives may be introduced into the preconditioning water for application to the grain. A storage tank for the additive and a proportional metering injection pump may be provided for that purpose.

From the preconditioning system 24 the wetted grain is deposited into a surge bin 26, from which the grain gravity flows into a steam chest 28. Each surge bin 26 provides a constant supply of grain for delivery into the corresponding steam chest 28. The surge bin 26 may be equipped with high and low level detectors 46, 48, information from which may be used by the control system 18 to control the speed and operation of the distribution and preconditioning equipment that supplies grain to the surge bin 26.

Grain is gravity fed from the surge bin 26 into the steam chest 28, which is typically kept full of grain. Steam is introduced into the steam chest 28 under computer control to deliver properly cooked and wetted grain to the flaking mill 30 in a continuous manner. A steam chest moisture sensor 50 may be positioned near the bottom of the steam chest 28, the output of which may be fed into the control system 18 as an input into the routine that controls the rate of introduction of steam into the steam chest 28. The measured "post-cooking" moisture level may also feed back to influence the amount of water added in the grain wetting system 24 (e.g. by changing the setpoint for the preconditioner moisture plate). The desired moisture level at the outlet from the steam chest is typically, for example, about 20%. Steam nozzles 52 may be located at various locations and elevations in the steam chest, and control valves 54 may be provided to selectively direct steam to each nozzle or group of nozzles. A master steam valve 56 may also be provided to provide a positive and complete shut-off of the entire steam supply.

Each steam chest 28 preferably includes a level indicator 58 to confirm to the automation system that it is full of grain, and a plurality of temperature sensors 60 placed at various levels in the steam chest 28. The steam inlet control valves 54 are modulated by the control system to provide a desired temperature profile in the steam chest 28.

The "cooked" grain may exit the bottom of the steam chest 28 through a rotary lock 62 which inhibits steam from escaping through the grain exit. A vent pipe 66 may be provided to allow excess steam to exit the steam chest 28. A humidistat 68 may be positioned in the vent pipe 66 to measure the amount of moisture in the stream that is released to the atmosphere. The steam release measurement may be provided as an input into the steam control algorithm. A peg feeder 64 or the like may be provided at the bottom of the steam chest 28 for metering "cooked" grain out of the steam chest 28 and into the flaking mill 30, which is described below. In preferred embodiments, the control system adjusts steam flow valves 54 to alter the steam flow rate as the peg feeder 64 rate is changed, so that, for example, more steam is input into the steam chest 28 when the grain throughput is increased.

The flaking mill 30 receives cooked grain from steam chest 28 and crushes the grain kernels into flakes by passing them through a narrow gap between two parallel rollers. A controlled flow of grain is introduced into the mill 30 from the steam chest 28, such as by a peg feeder 64. The gap between the rollers is monitored, as is the instantaneous power consumption (e.g., by measuring current) of the rollers. That information may be used by the control system to determine if the cooked grain is properly cooked and moistened. A vibration sensor may also be used to detect operational abnormalities, such as when the grain is excessively sticking to the rollers. Proximity switches may be employed to ensure proper and continuous grain flow. Temperature sensors may be provided to monitor the temperature of the material passing through the flaking mill. Speed (rpm) information may also be provided to the control system concerning the rollers in the flaking mill. A flake weight sensor or densimeter 70 may be employed to determine whether the flaked product has the desired density. A flaking mill moisture sensor 72 may also be provided to provide the moisture content of the flaked grain as it exits mill 30.

A feed-back control algorithm may be used by the control system to adjust the steam chest 28 conditions based on the data obtained from the sensors in the flaking mill 30, in order to optimize the operation of the flaking mill and the quality of the resulting product. Data from the flaking mill sensors may indicate that the incoming grain is too moist or too dry, or that it is over- or under-cooked. Appropriate corrections may be made by the control system to compensate for any such conditions, and historical data may be stored for future reference when processing similar grains. In the flaking mill 30 itself, the gap width and the roller speed are under the control of the automation system 18, as is the feed rate of grain entering the mill. All of these parameters may be altered by the control system 18 in order to compensate for differences in type and quality of incoming grain, quality control, desired flake characteristics, and other factors. The advantages of the comprehensive automatic control systems as described herein may also be realized with other types of feed-grain processing methods, including pelletizing. The flaking mill of the preferred embodiment as described herein may be replaced by a pelletizer or other apparatus, depending on the specific application in which the invention is to be used.

Figure 4:
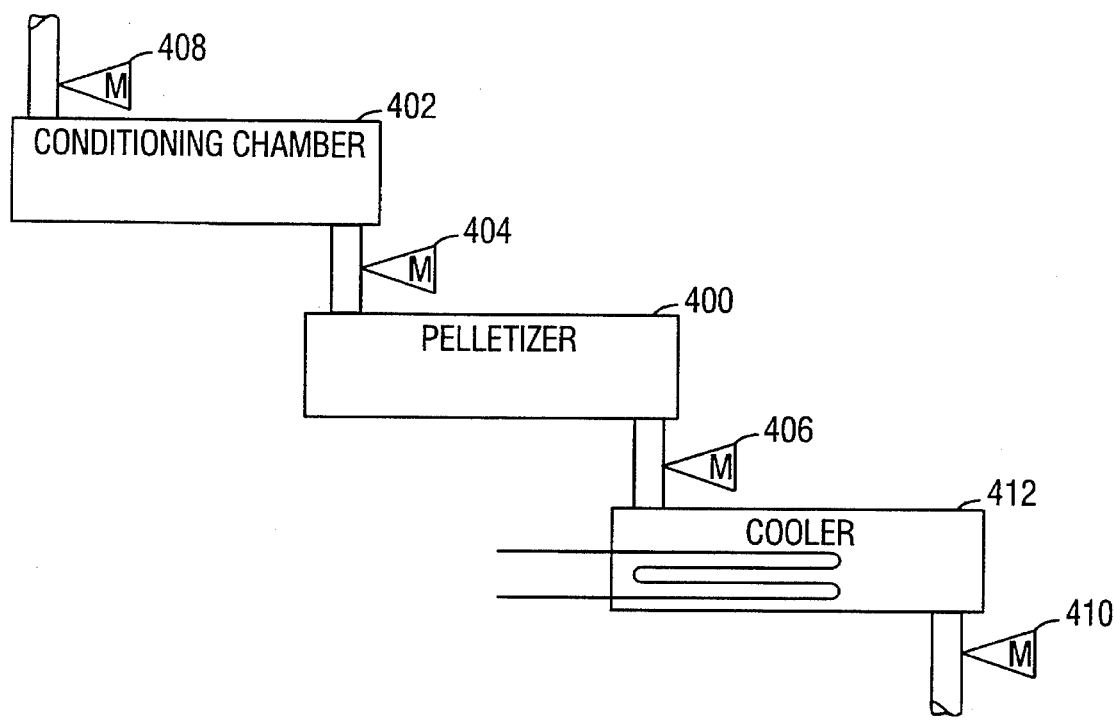
FIG. 4 is a simplified schematic diagram of a section of a pelleting process incorporating an embodiment of the present invention.

Referring to FIG. 4, for example, the pelletizer 400 may receive the cooked grain from a conditioning chamber 402 or steam chest when steam has been injected. In such an arrangement, the moisture content of the grain can be measured by first moisture sensor 404 as the grain enters the pelletizer, and the moisture content of the pelletized product may be measured by second moisture sensor 406 as it exits the pelletizer 400. Additionally, the moisture content of the grain may also be measured by third moisture sensor 408 as the grain enters the conditioning chamber 402 or steam chest and by fourth moisture sensor 410 down stream after the pelletized grain has passed through the pelletizer 400 and a cooling unit 412 so that the final product can be monitored. It is typically preferable that the pelletized grain exit the cooler 412 at a temperature within 10° F. of ambient and less than 14% moisture content to increase shelf life of the feed, as well as reduction of bacteria and mold growth.

Returning now to the embodiment of FIG. 1, from the exit of the flaking mill 30, the flaked grain is directed into storage bins 34, 36, 38, which may include level sensors 74, 76 and associated controls. In particular, the flaked grain may be transported by conveyor system such as a negative air (vacuum) system 78 into a holding (or "finished flake") bin 34, in which the level may be allowed to vary freely between preselected high and low levels, which may be established using level detectors 74, 76 as are known to those skilled in the art. Instruments may be placed in the vacuum conveying system 78 to monitor the air pressure and the material flow, such as pressure sensors 82 in the flow path and current sensors 84 on the blowers 80.

From the holding bin 34, which may operate as a flake surge bin, the flaked product may be directed into other storage bins by gravity flow or otherwise. The storage bins may include "live-bottom" bins 38, from which flaked product may be removed for use. The live bottom bins 38 may also include moisture sensors e.g. 78 to provide information to the control system regarding the moisture level of the finished product as it is dispensed to a user. There may be only one flake bin, or there may be several in series or in parallel. The bins may include scales, level detectors, or other devices to monitor the inflow and outflow of product.

Scales and mixing equipment may be incorporated into the flake bin system for measuring quantities of flakes transferred out of the bins and for mixing feed compositions. Molasses or other additives may be mixed with the flaked product. The mixing process may be instrumented to detect moisture levels, temperature, mixer speed and power, product levels, bulk density, etc. Finished feed compositions may then be stored in bins for transfer to feed trucks as desired.

The feed truck operation may also be included in the comprehensive automation system. Instrumentation on the truck may include scales, flow sensors, location sensors (e.g. GPS), feed bunk scanners, etc. A display in the truck may provide instructions to the driver, and telemetry equipment may be provided to permit wireless, real-time communication of data between the truck and the host computer. Accurate data regarding deliveries to and consumption by each pen of livestock may thus be acquired, and livestock performance data may be correlated with detailed feed grain and process information in order to optimize the entire system from incoming grain weight to outgoing beef weight. Truck operational parameters may also be monitored by the control system, such as RPM, speed, oil, fuel and water levels, etc.

Presently preferred embodiments of the present invention employ personal computers (PCs) to receive data and control inputs and to generate control outputs. Historical and background data may be collected to provide parameters for use in control algorithms relating to the type and quality of grain being processed, environmental considerations, etc. Data signals are received in real-time by the controlling PCs from the moisture and temperature sensors, the humidistat 68 and temperature sensors 60 in the steam chest 30, the level detectors in the surge bin 26 and the flake bins 34, 36, 38, the instrumentation associated with the flaking mill 30, and other sources.

In the preferred embodiments, the moisture sensors may be plate sensors that measure the conductance and capacitance of the material flowing over them. A temperature sensor is incorporated into each moisture sensor, because the measured parameters are temperature dependent. The resulting signals from the sensors are processed by computing equipment and converted by empirical correlations to percent moisture content by weight. Suitable moisture sensors, and related control apparatus and software, are sold under the trademark "DELTAWAVE" by ACECO, San Antonio, Tex. Other types of moisture measurement and control systems may be employed in alternative embodiments of the present invention.

Based on the inputs received by the control system 18, the control system generates control signals that control the operation of the grain receiving system 12, the distribution and storage systems 16, 14, the wetting system 24, the delivery rate of grain into the flaking mill 30, the steam rate into the steam chest 28 (perhaps at various levels), the operation of the flaking mill 30, and other aspects of the processing system.

The automatic control system may also receive inputs relating to power consumption, steam rates, labor and maintenance charges allocated to certain lots of grain or certain pieces of machinery, quality of the resulting flaked product, and other desired parameters. This information may be stored and processed to generate cost information, maintenance schedules and records, quality control reports, and data to assist in optimizing the process for quality and efficiency.

Figure 2:
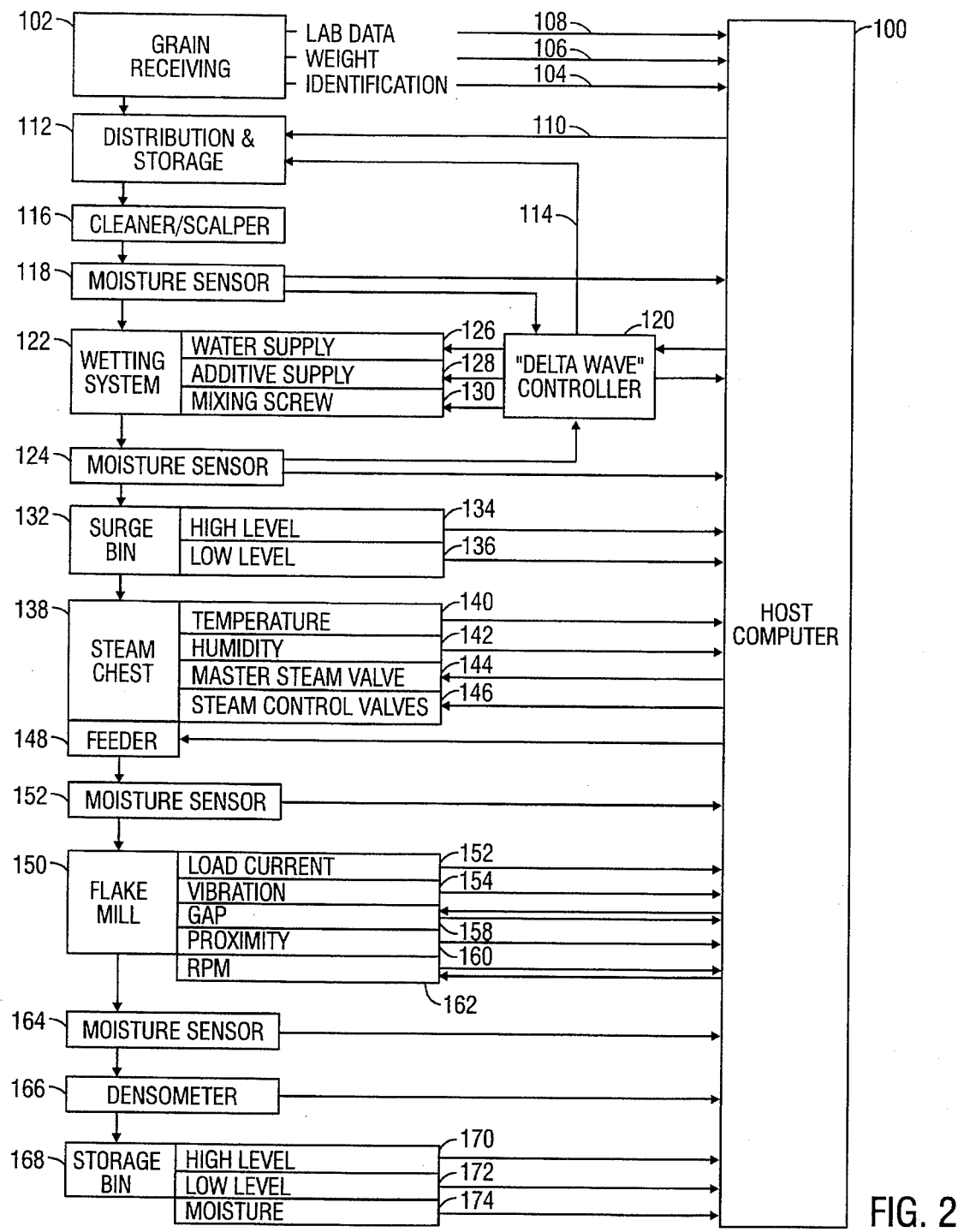
FIG. 2 is a schematic diagram showing the grain flow through a process according to this invention, and showing the control system connections between the various components of the processing apparatus.

Referring to FIG. 2, which schematically represents an automatically controlled feed grain processing system according to a preferred embodiment of the present invention, the host computer 100 may be a personal computer ("PC") or other suitable intelligent control device, such as a programmable logic controller ("PLC") or a combination of distributed control elements. From grain receiving station 102 a variety of information is provided to the host computer 100, including the identification of the lot of grain 104, and the weight of the grain 106. Other information about the lot, including source, type of grain, and lab results may also be provided to the host computer 100 via data path 108.

After the grain is received it is assigned to a storage bin, to which it may be conveyed by automated distribution equipment. The host computer 100 may maintain an inventory of stored grain, so that it can assign received grain to a desired storage location having adequate capacity. Data path 110 represents control of the distribution system 112 by host computer 100. The distribution system 112 is also responsible for retrieving grain from storage for processing, which may also be automatically controlled. The flow rate of grain being retrieved for processing may be controlled by a process controller 120 (using data path 114) or by host computer 100.

Retrieved grain is typically processed by a cleaner or scalper 116, which removes trash and debris from the grain (typically by screening), and which may also remove fines using methods known in the art. The outlet of the cleaner 116 may be connected directly to the inlet of the wetting system 122.

From the cleaner 116, the grain passes over the upstream moisture sensor 118, which may be connected to host computer 100 and/or to process controller 120. The grain then enters wetting (or "preconditioning") system 122. Preconditioner moisture plate 124 is located downstream from wetting system 122. Controller 120 may be connected via control signal lines to moisture sensors 118 and 124, which provide input data to controller 120. Controller 120 is also connected to host computer 100, which provides setpoints to and receives operational data from controller 120. Based on those inputs and the control algorithm, controller 120 controls the operation of the wetting system, including regulating the water supply 126, controlling the additive supply pump 128, and controlling mixing screw 130.

Continuing to refer to FIG. 2, in a preferred embodiment a conduit connects the wetting system outlet to the inlet of surge bin 132. Surge bin 132 may contain high level detector 134 and low level detector 136. Those level detectors are connected to host computer 100 via data signal lines. The control system can adjust the level of surge bin 132 by controlling the rate of incoming grain through the distribution system or by controlling the amount of outgoing grain by adjusting the speed of the feeder at the bottom of the steam chest.

From surge bin 132, the grain being processed travels to steam chest 138. "Cooked" grain is removed from the bottom of the steam chest by feeder 148. The rate of operation of feeder 148 may be controlled based on a signal from host computer 100. Temperature sensors 140 and humidity sensors 142 associated with the steam chest 138 may be connected by signal lines to host computer 100 to provide process control information. That information is used by host computer 100 to control the flow of grain through steam chest 138 and to control the introduction of steam into steam chest 138. In a preferred embodiment, master steam valve 144 is provided to control the supply of steam to a plurality of steam control valves 146. Steam control valves 146 are modulating values that receive signals from host computer 100 that control the amount of steam introduced at various locations within steam chest 138.

The outlet of feeder 148 is connected to the inlet of flaking mill 150. Steam chest moisture sensor 152 may be provided to measure the moisture content of the "cooked" grain before it is introduced into the flaking mill 150. Steam chest moisture sensor 152 could alternatively be located upstream of feeder 148. Moisture sensor 152 is connected to host computer 100 by a data line.

Flake mill 150 is connected to host computer 100 by a number of data and control lines. Host computer 100 may be adapted to send signals to flaking mill 150 to control the speed (RPM) 162 at which the rollers of flaking mill 150 operate. Host computer may also provide signals that control the gap 158 between the rollers of flake mill 150. Flake mill 150 may be provided with load current sensors 152 to provide information to host computer 100 regarding the power consumption of flake mill 150. The control system may be adapted to automatically correct for such a condition by altering the preconditioning stage of the steam chest operation. Vibration sensor 154 may be provided to detect excessive vibration in flake mill 150. Such vibration may be caused by overly wet or sticky grain adhering to the rollers in flake mill 150. Instrumentation of 158 may also be provided for measuring the gap between the rollers for transmission to host computer 100. Speed (RPM) sensors 162 may also be provided to permit feedback control of the speed of the flake mill rollers. Finally, the flake mill may include proximity switches to detect grain and flake levels within the flake mill. That information is also conveyed to host computer 100 so that fault conditions may be detected and recognized.

A flake mill moisture sensor 164 may be provided near the outlet of the flake mill for measuring the moisture content of the flaked grain product. A densometer 166 may also be provided for measuring the density of the flaked product. Both moisture sensor 164 and densometer 166 may be connected to host computer 100 to provide information for use by the computer for making operational adjustments in the flake mill, the steam chest, or the wetting system.

The outlet of the flake mill may be connected to one or more storage bins 168 which are provided to store the flaked product pending further processing or use. A typical storage bin may include a high level detector 170, a low level detector 172, or a moisture detector 174, all of which may be connected to host computer 100 by data signal lines.

Figure 3:
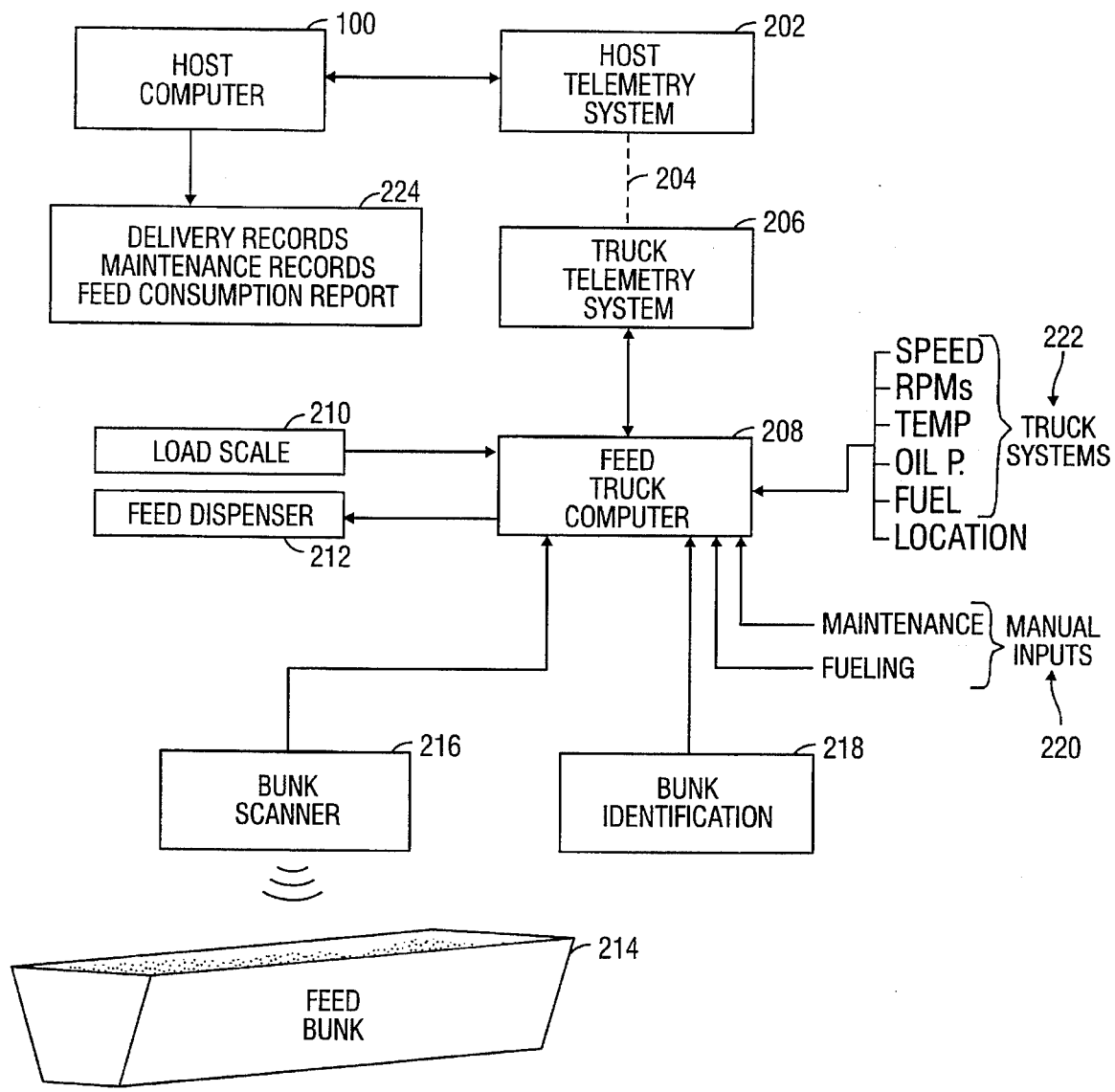
FIG. 3 is a block diagram of a feed distribution truck automation system according to an embodiment of this invention.

Referring now to FIG. 3, the comprehensive automation system of the present invention may be expanded to include automation of the trucks that are used to distribute feed from the feed processing facility to the feed bunks that are located at the feedlot livestock pens. A wireless telemetry system may be provided to establish real-time communications between a feed truck computer 208 and a host computer 100. The host computer 100 may be connected to host telemetry system 202 and the truck computer may be connected to truck telemetry system 206. A wireless communication link, typically using radio frequency signals, is shown connecting host telemetry system 202 with truck telemetry system 206. The telemetry system may be employed to convey instructions and data from the host computer 100 to the truck computer 208, or to transmit data and other information from truck computer 208 to host computer 100. Alternatively, the truck computer may operate independently, storing information that may be transferred to host computer 100 via a wire connection or magnetic media.

Instrumentation which may be provided on the feed truck includes load scale 210, bunk scanner 216, and means for providing bunk identification 218. Each of those inputs is connected to the feed truck computer by data signal conductors. Bunk scanner 216 is utilized to determine the amount of feed located in each feed bunk 214, so that the feed consumption of the livestock located in the corresponding pen can be calculated. The bunk identification input can be automatic based on the truck position, or it may be a manual operation that is performed by the truck driver.

A feed dispenser 212 may be mounted on the truck for conveying feed out of the truck and into feed bunk under the control of feed truck computer 208 or under the control of the truck driver.

Instrumentation may also be provided for monitoring truck systems. For example, sensors may be connected to the feed truck computer for monitoring truck speed, truck engine RPM, coolant temperature, oil pressure, fuel level, and truck location. Truck location may be provided by GPS (Global Positioning System) equipment. Other information 220 may be manually inputted into the truck computer, such as data relating to maintenance and fueling of the truck. All of the data pertaining to the truck operation may be conveyed from the feed truck computer to the host computer 100 using the telemetry system. The host computer 100 can then generate detailed records regarding truck operation, including delivery records, maintenance records, feed consumption reports, and driver performance reports. Automation of feed truck operations thus permits total control and comprehensive monitoring of all aspects of the feed production and distribution system, permitting heretofore unavailable information to be acquired for use in optimizing feedlot operations.

Based on the description contained herein, it would be apparent to one skilled in the art how to implement the actual control programs using personal computers and other control elements. The inventors do not consider their currently preferred embodiments to be the best possible ways to accomplish the functions performed by the invention, but rather they represent one of a number of alternative acceptable ways to implement the invention.

The details of specific implementation of the control system, including the specific hardware design and the software programs that carry out the functions described in this patent, are not in and of themselves considered to be limiting of this invention. One skilled in the art could implement this invention using well-known hardware and software techniques. Those aspects of the preferred embodiments of the invention that are considered to be particularly beneficial or unusual are specified herein. Other components and methods that are used in the present embodiments are considered to be routinely available in the an and their selection and combination is a matter of routine design choice, in light of the description of the invention that is set forth herein.

Further modifications and alternative embodiments of this invention will be apparent to those skilled in the art in view of this description. Accordingly, this description is to be construed as illustrative only and is for the purpose of teaching those skilled in the an a manner of carrying out the invention. It is to be understood that the forms of the invention herein shown and described are to be taken as the presently preferred embodiments. Various changes may be made in the shape, size, and arrangement of pans. For example, equivalent elements or materials may be substituted for those illustrated and described herein, and certain features of the invention may be utilized independently of the use of other features, all as would be apparent to one skilled in the art after having the benefit of this description of the invention.

We claim:

1. An automated, continuous process feed grain conditioning system for manufacturing a flaked grain livestock feed product comprising:

a grain storage facility;

a grain conveyor connected to the storage facility for conveying grain from the storage facility to a wetting system;

a wetting system having an input for receiving grain from the grain conveyor, the wetting system including a mixing chamber, a mixing auger disposed within the mixing chamber, a nozzle for
adding liquid to the grain within the chamber, a liquid control valve coupled
to the nozzle and to a source of liquid, and an output for wetted grain;

a first moisture sensor that generates a first moisture signal indicative of a moisture content of the grain at the input of the wetting system;

a second moisture sensor that generates a second moisture signal indicative of a moisture content of the grain at the output of the wetting system;

a steam chest coupled to the output of the wetting system to receive wetted grain from the wetting system, the steam chest including one or more steam inlet nozzles, one or more steam control valves coupled to the steam inlet nozzles, and an output for steamed grain;

a third moisture sensor that generates a third moisture signal indicative of a moisture content of the grain at the output of the steam chest;

a flaking mill connected to the output of the steam chest to receive steamed grain from the steam chest; and an automatic electronic control system coupled to the first, second and third moisture sensors for receiving the corresponding moisture signals, the control system also coupled to the liquid and steam control valves for controlling an amount of liquid and steam applied to the grain in response to the moisture signals.

2. The system of claim 1, wherein the steam chest has temperature sensors mounted therein, the temperature sensors being connected to the control system to provide temperature signals to the control system.

3. The system of claim 1, wherein the steam chest has a steam vent, further comprising a moisture sensor mounted in the steam vent, the moisture sensor being connected to the control system to provide a vent moisture signal to the control system.

4. The system of claim 1, further comprising a surge bin positioned between the wetting system and the steam chest.

5. The system of claim 4, further comprising a surge bin high level sensor that signals the control system if the grain level in the surge bin exceeds a preselected level.

6. The system of claim 1, further comprising a feeder for metering steamed grain out of the steam chest and into the flaking mill, the feeder having a speed controller receiving control signals from the automatic control system.

7. The system of claim 6, wherein the feeder is a peg feeder.

8. The system of claim 1, further comprising a densimeter positioned at the outlet of the flaking mill and connected to provide a flaked grain density signal to the control system.

9. The system of claim 1, further comprising a fourth moisture sensor positioned at the outlet of the flaking mill and connected to provide a flaked grain moisture content signal to the control system.

10. The system of claim 6, wherein the flaking mill comprises a pair of parallel rollers having an adjustable gap therebetween, the mill having a roller speed controller and a gap width controller, both the speed controller and the gap width controller receiving control signals from the automatic control system.

11. The system of claim 10, wherein the flaking mill includes a grain level detector that provides a flaking mill level signal to the automatic control system for use in controlling the feeder speed.

12. The system of claim 10, wherein the flaking mill includes a mill power sensor that provides a flaking mill power consumption signal to the automatic control system for use in controlling the feeder speed.

13. An automated, continuous feed grain conditioning system for manufacturing a flaked grain livestock feed product, comprising:

a grain storage facility;

a grain conveyor connected to the storage facility for conveying grain from the storage facility to a wetting system;

a wetting system having an input connected to receive grain from the grain conveyor, the wetting system including a mixing chamber, a mixing auger disposed within the mixing chamber, a nozzle for adding liquid to the grain within the chamber, a liquid control valve coupled to the nozzle and to a source of liquid, and an output for wetted grain;

a first moisture sensor for generating a first moisture signal indicative of a moisture content of the grain at the input of the wetting system;

a second moisture sensor for generating a second moisture signal indicative of a moisture content of the grain at the output of the wetting system;

a surge bin having an input coupled to the output of the wetting system to receive wetted grain from the wetting system, the surge bin including high and low grain level sensors for generating surge bin level signals, and an output for wetted grain;

a steam chest coupled to the output of the surge bin to receive wetted grain from the surge bin, the steam chest including one or more steam inlet nozzles, one or more steam control valves coupled to the steam inlet nozzles, and an output for steamed grain, the steam chest also having one or more temperature sensors mounted therein for generating steam chest temperature signals;

a third moisture sensor generating a third moisture signal indicative of a moisture content of the grain at the output of the steam chest;

a feeder connected to the output of the steam chest to receive steamed grain from the steam chest, the feeder having a feeder controller for controlling the rate at which steamed grain is delivered out of the steam chest, and an output for steamed grain;

a flaking mill coupled to the output of the feeder to receive steamed grain from the feeder, the flaking mill having an output for flaked grain;

a holding bin coupled to the output of the flaking mill to receive flaked grain from the flaking mill; and an automatic electronic control system coupled to the first, second and third moisture sensors for receiving the corresponding moisture signals, the control system also connected to the temperature sensors in the steam chest for receiving steam chest temperature signals, the control system also coupled to the liquid and steam control valves for controlling an amount of liquid and steam applied to the grain in response to the moisture signals;

the control system also connected to the high and low level detectors in the surge bin to receive surge bin level signals, the control system also connected to the conveyor for controlling the rate at which grain is delivered into the wetting system based on the surge bin level signals;

the control system also connected to the feeder controller for regulating the rate at which steamed grain is delivered from the steam chest into the flaking mill.

14. An improved programmable control system for obtaining a desired moisture level in feed grain as the grain is conditioned prior to further processing, the grain being conveyed through a pre-conditioning mixing chamber to a steamer assembly prior to further processing, the control system comprising:

a pre-conditioning mixing chamber having an input for receiving grain, the mixing chamber adapted for adding and mixing a controlled amount of moisture to the grain as it passes through the mixer, and having an output for grain;

a steamer assembly for receiving the grain from the mixing chamber and steaming the grain, the steamer assembly having an input connected to the output of the pre-conditioning mixing chamber and having an output for steamed grain;

a first moisture sensor which receives at least a portion of the grain as it exits the steamer assembly, said first moisture sensor generating a first electrical signal indicative of a moisture content of the grain as it exits the steamer assembly;

an electrically activated valve adapted to regulate the amount of moisture added to the mixing chamber; and a controller adapted to receive the first electrical signal from the first moisture sensor and output a control signal responsive thereto to cause said valve to regulate the amount of moisture added to the mixing chamber whereby a desired moisture content level is maintained in the grain as the grain exits the steamer assembly.

15. The control system as recited in claim 14 further comprising:

a second moisture sensor that generates a second electrical signal representative of the moisture content of the grain as it passes into the mixing chamber, said second signal provided to said controller and said controller adapted to combine the first and second signals to derive said control signal.

16. The control system as recited in claim 15 further comprising:

a third moisture sensor that generates a third electrical signal representative of the moisture content of the grain as it passes out of the mixing chamber, said third signal provided to the controller and the control signal being responsive to the first, second and third electrical signals.

17. An automatic control system for controlling the moisture content of feed grain as the grain is conditioned prior to being milled, the grain being conveyed from a storage container through a pre-conditioning mixing chamber to a steamer prior to being milled, said control system comprising:

a storage container;

a pre-conditioning mixing chamber having an input for receiving grain from the storage container, the mixing chamber adapted for adding and mixing a controlled amount of moisture to the grain as it passes through the mixer, and having an output for grain;

a steamer assembly for receiving the grain from the mixing chamber and steaming the grain, the steamer assembly having an input connected to the output of the pre-conditioning mixing chamber and having an output for steamed grain;

a first moisture sensor that generates a first electrical signal indicative of a moisture content of the grain as it passes into the mixing chamber;

a second moisture sensor that generates a second electrical signal indicative of a moisture content of the grain at the output of the mixing chamber as it exits the mixing chamber;

a third moisture sensor that generates a third electrical signal indicative of a moisture content of the grain as it exits the steamer, and a controller adapted to monitor the first, second and third electrical signals from said moisture sensors and control the amount of moisture added to the grain during conditioning in response to said electrical signals.

18. The control system as recited in claim 14 further comprising an electrically activated valve adapted to regulate the amount of moisture added to the mixing chamber.

19. The control system as recited in claim 18 wherein the controller outputs a control electrical signal to said valve to cause said valve to regulate the amount of moisture added to the mixing chamber whereby a desired moisture content is maintained in the grain as said grain exits the steamer.

20. The control system as recited in claim 17 further comprising an electrically activated steam valve adapted to regulate an amount of moisture added to the grain as it is conveyed through the steamer.

21. A feed grain conditioning process line for conditioning feed grain to obtain a desired moisture content before being milled, said process line comprising:

a grain conveyor;

a pre-conditioning mixing chamber having an input for receiving the grain from the grain conveyor, the mixing chamber adapted for adding and mixing a controlled amount of moisture to the grain as it passes through the mixer, and having an output for grain;

a steamer assembly for receiving the grain from the mixing chamber and steaming the grain for a predetermined time at a predetermined temperature the steamer assembly having an input connected to the output of the pre-conditioning mixing chamber and having an output for steamed grain;

a first moisture sensor that generates a first electrical signal indicative of a moisture content level of the grain at the input of the mixing chamber;

a second moisture sensor that generates a second electrical signal indicative of a moisture content of the grain at the output of the mixing chamber;

a third moisture sensor that generates a third electrical signal indicative of a moisture content of the grain at the output of the steamer assembly;

a first valve adapted to regulate the amount of moisture added to the mixing chamber;

a second valve adapted to regulate the amount of moisture added to the grain as the grain is conveyed through the steamer assembly, and a controller adapted to receive the first, second and third electrical signals and provide a first control signal to the first valve to cause the first valve to regulate the amount of moisture added to the grain in the mixing chamber, and a second control signal to the second valve to cause the second valve to regulate the amount of moisture added to the grain in the steamer assembly.

22. An automated steam chest for processing feed grains, comprising:
- an enclosure for containing grain to be steamed, the enclosure having an interior;
- an electronic control system connected to the steam chest for monitoring and controlling the operation of the steam chest;
- a grain inlet formed at an upper end of the enclosure;
- a grain outlet formed at a lower end of the enclosure;
- a steam vent connecting the interior of the enclosure to the atmosphere external to the enclosure;
- a plurality of steam inlet nozzles operatively positioned to inject steam into the enclosure;
- a plurality of steam control valves connected to the nozzles by steam conduits and connected to the control system by control signal conductors;
- a master steam valve connected to each of the steam control valves for distributing steam to each of the control valves;
- at least one temperature sensor mounted in the enclosure and connected to the control system to provide temperature information to the control system;
- a moisture sensor located at the outlet of the steam chest to measure the moisture content of the grain as it exits the steam chest, the moisture sensor being connected to the control system; and
- a humidity sensor positioned in the steam vent and connected to the control system.

23. The steam chest of claim 22, further comprising a rotary lock that permits steamed grain to exit the bottom grain outlet of the steam chest while preventing steam from leaving the enclosure.

24. The steam chest of claim 22, further comprising a level detector attached to the enclosure and adapted to provide a signal to the control system representing a grain level in the steam chest.

25. An automated, continuous process feed grain conditioning system for manufacturing a pelletized livestock feed product, comprising:
- a grain conditioning chamber having an input for receiving the grain to be processed, the grain conditioning chamber for adding moisture to said grain as the grain passes through the chamber, and having an output for grain;
- a first moisture sensor positioned to receive at least a part of the grain as it exits the conditioning chamber, the sensor generating a first signal indicative of a moisture content of the grain as it exits the chamber;
- a livestock feed pelletizer having an input for receiving the grain from said chamber and first sensor, the pelletizer for forming livestock feed pellets from the grain and having an output for the grain;
- a second moisture sensor that receives at least a part of the pellets as they exit the pelletizer, the sensor generating a second signal indicative of a moisture content of the pellets as they exit the pelletizer; and
- a controller adapted to receive the first and second electrical signals and output a control signal responsive thereto to said conditioning chamber whereby the amount of moisture in the pellets is controlled.

26. The system of claim 25, further comprising a
- third moisture sensor for receiving at least a portion of the grain as it enters the conditioning chamber, said sensor generating a third electrical signal representative of the grain as it enters said chamber, said third signal received by the controller;
- a cooler assembly for receiving the grain as it exits the pelletizer, said assembly adapted for lowering the temperature of the grain as it passes through the assembly; and
- a fourth moisture sensor for receiving at least a portion of the grain after the grain has exited the cooler said sensor generating a fourth electrical signal representative of the moisture content of the grain as it exits the cooler, said fourth signal received by the controller.

* * * * *

UNITED STATES PATENT AND TRADEMARK OFFICE
CERTIFICATE OF CORRECTION

PATENT NO. : 5,598,770
DATED : February 4, 1997
INVENTOR(S) : Thomas S. Campbell, Ken W. Ridenour, William F. Casey It is certified that error appears in the above-identified patent and that said Letters Patent is hereby corrected as shown below:

In claim 21, column 16, line 42, after "temperature" please insert --,--.

In claim 23, column 17, line 32, please delete "bottom".

Signed and Sealed this

Twenty-second Day of April, 1997

*Attest:*

BRUCE LEHMAN

*Commissioner of Patents and Trademarks*

*Attesting Officer*